(12) United States Patent
Sato et al.

(10) Patent No.: US 9,248,773 B2
(45) Date of Patent: Feb. 2, 2016

(54) MANNED VEHICLE AND CABIN STRUCTURE THEREOF

(75) Inventors: Makoto Sato, Tokyo (JP); Yujiro Sawasaki, Tokyo (JP); Keiji Ito, Kyoto (JP); Miyahito Hase, Tokyo (JP); Hidehiko Makida, Kyoto (JP); Makoto Morishima, Tokyo (JP); Hiromasa Nishino, Tokyo (JP); Yorikata Mizokami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/009,476

(22) PCT Filed: Jan. 27, 2012

(86) PCT No.: PCT/JP2012/051889
§ 371 (c)(1),
(2), (4) Date: Nov. 27, 2013

(87) PCT Pub. No.: WO2012/147381
PCT Pub. Date: Nov. 1, 2012

(65) Prior Publication Data
US 2014/0090913 A1 Apr. 3, 2014

(30) Foreign Application Priority Data

Apr. 26, 2011 (JP) .................................. 2011-098697

(51) Int. Cl.
*B62D 33/06* (2006.01)
*B60P 3/00* (2006.01)
*B62D 39/00* (2006.01)

(Continued)

(52) U.S. Cl.
CPC ............ *B60P 3/005* (2013.01); *B60H 1/00378* (2013.01); *B62D 33/06* (2013.01); *B62D 39/00* (2013.01); *B66F 9/07545* (2013.01);
(Continued)

(58) Field of Classification Search
CPC .......... B62D 33/06; B62D 39/00; F41H 7/03; G21F 1/00; G21F 1/015; B60P 3/005; B60H 1/00378; B60H 2001/00235
USPC ............. 180/271, 89.12; 296/190.01, 190.03, 296/190.08, 190.09, 190.1; 89/36.08
See application file for complete search history.

(56) References Cited

U.S. PATENT DOCUMENTS 3,212,809 A * 10/1965 Johnston ..................... 296/181.1
3,256,440 A * 6/1966 Stark ........................... 250/516.1

(Continued)

FOREIGN PATENT DOCUMENTS

CA     2 716 933 A1    11/2009
CN   101960251 A      1/2011

(Continued)

OTHER PUBLICATIONS

International Preliminary Report on Patentability mailed Nov. 7, 2014 in PCT/JP2012/051889.

(Continued)

*Primary Examiner* — Ruth Ilan
(74) *Attorney, Agent, or Firm* — Birch, Stewart, Kolasch & Birch, LLP

(57) ABSTRACT

A cabin is formed as a casing body partitioned and separable from a vehicle body and includes an air purifier for introducing purified air into the casing body to maintain the pressure inside the cabin at a positive level by the air purifier.

6 Claims, 16 Drawing Sheets

(51) Int. Cl.
  *F41H 7/03* (2006.01)
  *G21F 5/14* (2006.01)
  *G21F 3/00* (2006.01)
  *B66F 9/075* (2006.01)
  *B60H 1/00* (2006.01)

(52) U.S. Cl.
  CPC . *F41H 7/03* (2013.01); *G21F 3/00* (2013.01); *G21F 5/14* (2013.01); *B60H 2001/00235* (2013.01)

(56) References Cited

U.S. PATENT DOCUMENTS

| | | | |
|---|---|---|---|
| 3,417,576 A * | 12/1968 | Stucky | B60H 1/3229 55/490 |
| 4,098,093 A * | 7/1978 | Czyl | B60H 1/3226 62/243 |
| 4,616,872 A * | 10/1986 | Akira et al. | 296/190.11 |
| 4,721,031 A * | 1/1988 | Nakata et al. | 454/121 |
| 5,113,078 A | 5/1992 | Takashi et al. | |
| 5,310,239 A * | 5/1994 | Koske et al. | 296/26.08 |
| 5,363,420 A | 11/1994 | Polydor et al. | |
| 5,472,378 A * | 12/1995 | Skoff | 454/141 |
| 5,826,440 A * | 10/1998 | Okada | B60H 1/00378 62/239 |
| 6,276,750 B1 * | 8/2001 | Frisch | 296/190.1 |
| 6,340,201 B1 | 1/2002 | Higuchi | |
| 6,374,935 B1 * | 4/2002 | Kirschenmann et al. | 180/89.12 |
| 7,287,810 B2 | 10/2007 | Ishii et al. | |
| 7,338,357 B2 * | 3/2008 | Voit et al. | 454/158 |
| 8,646,557 B2 | 2/2014 | Yamamoto et al. | |
| 2009/0120273 A1 * | 5/2009 | Eckdahl et al. | 89/36.08 |
| 2010/0218669 A1 * | 9/2010 | Cunningham et al. | 89/36.08 |
| 2010/0270818 A1 | 10/2010 | Mills | |
| 2013/0221704 A1 | 8/2013 | Kim | |

FOREIGN PATENT DOCUMENTS

| | | |
|---|---|---|
| DE | 24 24 411 A1 | 12/1975 |
| DE | 10 2005 010 179 A1 | 9/2006 |
| DE | 20 2007 002 768 U1 | 7/2008 |
| EP | 0 248 322 A2 | 12/1987 |
| EP | 2042814 A2 | 4/2009 |
| JP | 2-123482 U | 10/1990 |
| JP | 3-172797 A | 7/1991 |
| JP | 5-12625 U | 2/1993 |
| JP | 6-342096 A | 12/1994 |
| JP | 2000-113212 A | 4/2000 |
| JP | 2000-170210 A | 6/2000 |
| JP | 2001-289990 A | 10/2001 |
| JP | 2002-104238 A | 4/2002 |
| JP | 2002-188181 A | 7/2002 |
| JP | 2006-232010 | 9/2006 |
| JP | 2007-113971 A | 5/2007 |
| JP | 4268162 B2 | 2/2009 |
| JP | 2010-129739 A | 6/2010 |
| JP | 2011-523916 A | 8/2011 |
| KR | 2010-0112181 A | 10/2010 |
| MX | 2010009142 A | 9/2010 |
| WO | WO 2009/139944 A2 | 11/2009 |
| WO | WO 2009/139944 A3 | 11/2009 |
| WO | WO 2012/147381 A1 | 11/2012 |

OTHER PUBLICATIONS

International Preliminary Report on Patentability mailed Nov. 7, 2014 in PCT/JP2012/051890.
International Search Report for PCT/JP2012/051889 mailed Apr. 26, 2011.
International Search Report for PCT/JP2012/051890 mailed Apr. 26, 2011.
Supplementary European Search Report for European Application No. 12776123.7, dated Nov. 11, 2014.
European Search Report dated Aug. 25, 2014 issued in related Application No. 12777154.1.
US Office Action mailed Aug. 28, 2014 for related U.S. Appl. No. 14/009,471.
Japanese Decision to a Grant Patent dated Jul. 10, 2015, for Japanese Application No. 2011-098696 with the English translation.
Japanese Decision to Grant a Patent, dated Oct. 19, 2015, issued in corresponding Japanese Patent Application No. 2011-098697 (with English translation).

* cited by examiner

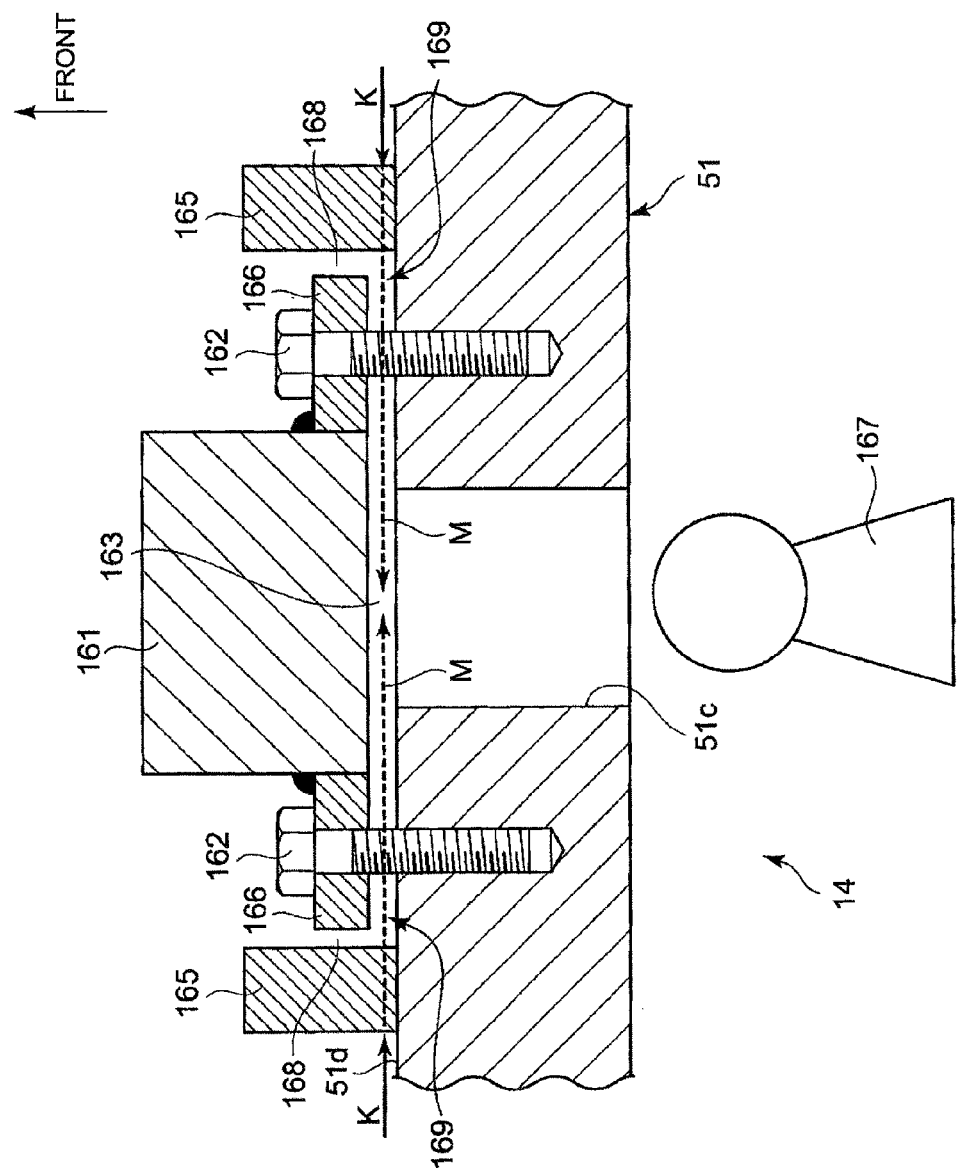

MANNED VEHICLE AND CABIN STRUCTURE THEREOF

TECHNICAL FIELD

The present invention relates to a manned vehicle for special environment use that can be driven and operated safely by a driver or operator inside a cabin in an environment where radiation, radioactive or other harmful substances (hereinafter referred to collectively as "special substances") that adversely affect human health are present (hereinafter referred to as "special environments"), and to the cabin attached to this vehicle. More particularly, the invention relates to enabling alteration of a work vehicle that can be used in a normal environment into a manned vehicle for special environment use.

BACKGROUND ART

A transport apparatus for transporting radiation shielding members and an operator cab structure for this transport apparatus (see, for example, Patent Document 1), and a vehicle (car) with a retrofitted radiation protection device and a vehicle interior structure for this vehicle (see, for example, Patent Document 2) are known as examples of a manned vehicle for special environment use and a cabin structure for this vehicle.

According to FIG. 2 of Patent Document 1, the transport apparatus 5 is configured to run on continuous tracks 8, with an operator cab 9 surrounded by radiation shield plates provided on the continuous tracks 8.

According to FIG. 1 and FIG. 2 of Patent Document 2, the vehicle body 1 has a windshield part 2a covered by a first shielding member 3 and side parts 4 covered by second shielding members 20.

Patent Document 1: Japanese Patent Application Laid-open No. 2001-289990

Patent Document 2: Japanese Patent No. 4268162

Patent Document 1 does not describe in detail the structure of attaching the operator cab 9 on the continuous tracks 8. Substantial alteration may be needed if the shielding capabilities of the operator cab 9 are to be changed in accordance with the level of radiation exposure in the environment, which will increase the cost.

According to Patent Document 2, shielding members are attached to a common vehicle (car), but it would be difficult to cover the entire vehicle completely with shielding members. With no precaution against possible ingress of fine particles of special substances into the vehicle interior, it would also be difficult to provide sufficient countermeasures against special substances.

DISCLOSURE OF THE INVENTION

An object of the present invention is to enable easy alteration of a vehicle usable in a normal environment into a manned vehicle with sufficient countermeasures against special substances, and to provide the manned vehicle and a cabin structure of this vehicle.

To achieve the object, the present invention provides a manned vehicle, including: a vehicle body having at least an engine and a vehicle moving mechanism driven by the engine; and a cabin storing an operation terminal for operating the engine and the vehicle moving mechanism and accommodating an operator who operates the operation terminal or a passenger, characterized in that the cabin is formed as a casing body partitioned and separable from the vehicle body and includes a purified air introducing unit for introducing purified air into the casing body to maintain a positive pressure level inside the cabin by the purified air introducing unit.

According to the present invention, the cabin is formed as a casing body partitioned and separable from the vehicle body, so that it is possible to provide a protection structure to the cabin only, and as a consequence, it is easy to alter a vehicle that is usable in a normal environment into the manned vehicle for special environment use.

Therefore, it is also easy to alter the vehicle such that only the cabin is pressurized with the purified air introducing unit. This way, even if the casing body has gaps, ingress of special substances is prevented by the raised internal pressure.

The present invention also provides a cabin structure of a manned vehicle for special environment use, the cabin being mounted on a vehicle body having at least an engine and a vehicle moving mechanism driven by the engine, the cabin storing an operation terminal for operating the engine and the vehicle moving mechanism and having a space for accommodating an operator who operates the operation terminal or a passenger, characterized in that the cabin is formed as a casing body partitioned and separable from the vehicle body and includes a purified air introducing unit for introducing purified air into the casing body to maintain a positive pressure level inside the cabin.

Preferably, the cabin may have an air intake port in an upper part of the cabin to introduce purified air from this air intake port.

According to the present invention, the cabin is formed as a casing body partitioned and separable from the vehicle body, so that it is possible to provide a protection structure to the cabin only, and as a consequence, it is easy to alter a cabin of a vehicle that is usable in a normal environment into a cabin of a manned vehicle for special environment use.

Therefore, it is also easy to alter the vehicle such that only the cabin is pressurized with the purified air introducing unit. This way, even if the casing body has gaps, ingress of special substances is prevented by the raised internal pressure.

The casing body is characterized in that it is covered by lead glass on a front side and a rear side in a vehicle moving direction with front and rear visibility, and the casing body has at least a ceiling formed of a metal plate capable of functioning as a shielding mass, and that the purified air introducing unit including a blower and a decontamination filter connected to a suction port or a discharge port of the blower is installed in the ceiling.

With the present invention, since the purified air introducing unit is located in the ceiling of the casing body, it is free of installation restrictions caused by the lead glass for achieving front and rear fields of view of the vehicle, and also the ceiling made of metal plate has high strength and can support a large purified air introducing unit.

The purified air introducing unit hardly takes in special substances that may be stirred and scattered by the moving mechanism of the vehicle as it is driven, so that the collection efficiency of the decontamination filter can be maintained high for a long period of time.

As described above, according to the present invention, the cabin is formed as a casing body partitioned and separable from the vehicle body, so that it is possible to provide a radiation protection structure to the cabin only, and as a consequence, it is easy to alter a vehicle that is usable in a normal environment into a manned vehicle for special environment use.

Therefore, it is also easy to alter the vehicle such that only the cabin is pressurized with the purified air introducing unit.

This way, even if the casing body has gaps, ingress of special substances is prevented by the raised internal pressure.

Since the purified air introducing unit is located in the ceiling of the casing body, it is free of installation restrictions caused by the lead glass for achieving front and rear fields of view of the vehicle, and also the ceiling made of metal plate has high strength and can support a large purified air introducing unit.

Moreover, the purified air introducing unit located at a high position hardly takes in special substances that may be stirred and scattered by the moving mechanism of the vehicle as it is driven, so that the collection efficiency of the decontamination filter can be maintained high for a long period of time.

BRIEF DESCRIPTION OF THE DRAWINGS

FIG. 17 is a cross-sectional view showing the attachment state and effect of baffles according to the present invention;

BEST MODE FOR CARRYING OUT THE INVENTION

The illustrated embodiments of the present invention will be hereinafter described in detail. It should be noted that, unless otherwise particularly specified, the sizes, materials, shapes, and relative arrangement or the like of constituent components described in these embodiments are not intended to limit the scope of this invention.

Embodiments

Figure 1:
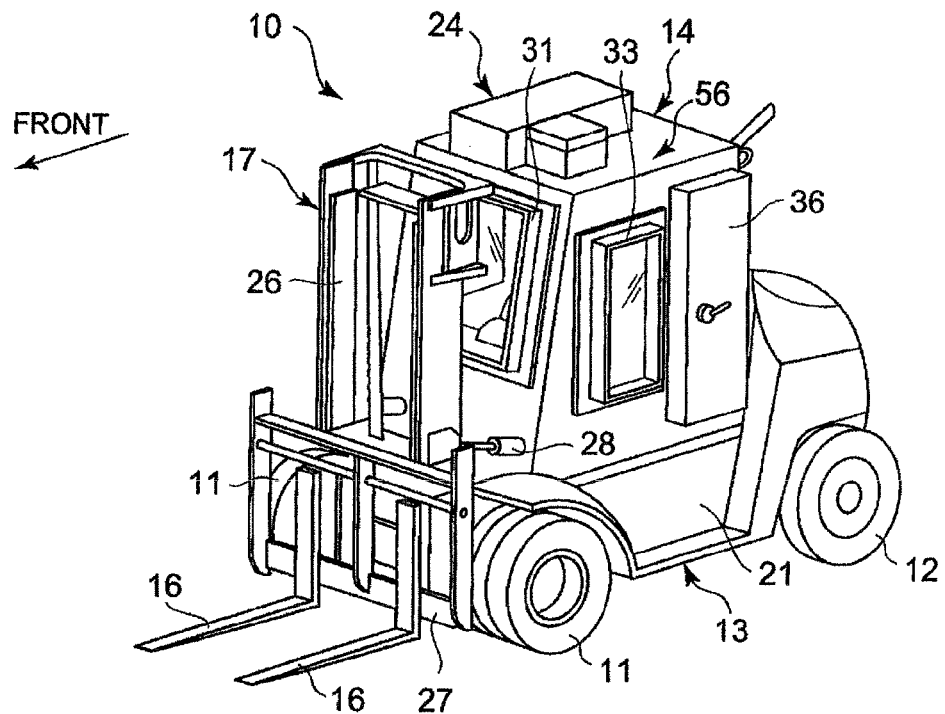
FIG. 1 is a first perspective view of a manned vehicle for special environment use according to the present invention.
Figure 2:
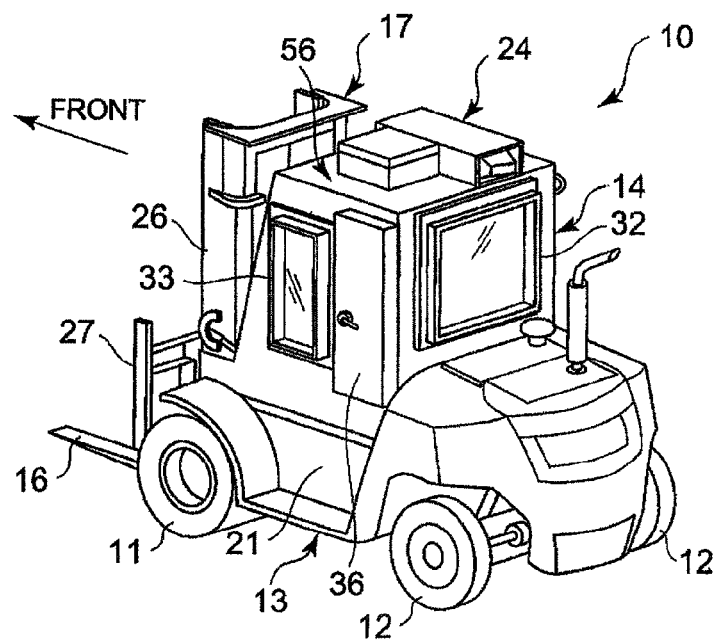
FIG. 2 is a second perspective view of the manned vehicle for special environment use according to the present invention.

The fork lift 10 shown in FIG. 1 and FIG. 2 is an industrial vehicle used for carrying out work in a special environment in particular, such as transporting radioactive waste containers. The structural difference from a common fork lift is that it has a cabin shielded from special substances to protect an operator who controls the operation terminal or a passenger.

More specifically, the fork lift 10 is made up of a vehicle body 13 having a pair of left and right front wheels 11 and a pair of left and right rear wheels 12 (reference numerals denoting only those visible on the viewer's side), a cabin 14 attached on top of this vehicle body 13, and a mast device 17 provided to the front of the vehicle body 13 with a pair of left and right forks 16 movable up and down.

The vehicle body 13 includes therein an engine 37 (see FIG. 3) that is the power source for driving the front wheels 11, a transmission 38 (see FIG. 3) that changes gears and transfers power from this engine 37, a hydraulic pump as a hydraulic pressure source for moving the forks 16 up and down, a battery for starting the engine and supplying electric power to electronic equipment, and an air conditioner for conditioning the air inside the cabin 14, all these being covered by a vehicle body cover 21.

The cabin 14 is formed as a casing body made by a plurality of thick metal plates and lead glass. These thick metal plates and lead glass prevent transmission of special substances into the cabin.

On top of the ceiling of the cabin 14 is attached an air purifier 24 as a purified air introducing unit that decontaminates and introduces outside air into the cabin 14. The pressure inside the cabin 14 is increased to a level higher than the atmosphere by introducing outside air into the cabin 14, so as to prevent ingress of special substances. The internal pressure of the cabin 14 is maintained at, for example, about 2 atmospheres.

The air purifier 24 is installed in the ceiling of the cabin 14 so that the air purifier 24 is positioned farthest possible from the ground, to reduce the effects of special substances from the ground as much as possible.

A normal fork lift has a vehicle control unit or engine control unit and various electronic equipment for controlling, for example, the engine, transmission, hydraulic pump, and air conditioner, disposed in the vehicle body 13. The fork lift 10, however, has these control units 43 (see FIG. 3) and necessary electronic equipment 45 (see FIG. 3) located inside the cabin 14 to avoid effects of radiation and to protect them from special substances.

The mast device 17 includes a mast 26 attached to a front lower part of the vehicle body 13 to be pivotable, a lift bracket 27 attached to this mast 26 to be movable up and down, the forks 16 attached to this lift bracket 27, and a drive mechanism (not shown) for extending and contracting the mast 26 to move the lift bracket 27 up and down, and tilt cylinders 28 extending between the vehicle body 13 and the mast 26 to tilt the mast 26 forward and backward.

The mast 26 consists of an outer mast on the side of the vehicle body 13 and an inner mast attached to this outer mast to be movable up and down.

The drive mechanism includes a lift cylinder for moving the inner mast up and down, a chain passing from a stationary part of this lift cylinder to the lift bracket 27, and a roller provided at the top of a movable part of the lift cylinder to support a middle part of the chain as it rotates.

Figure 3:
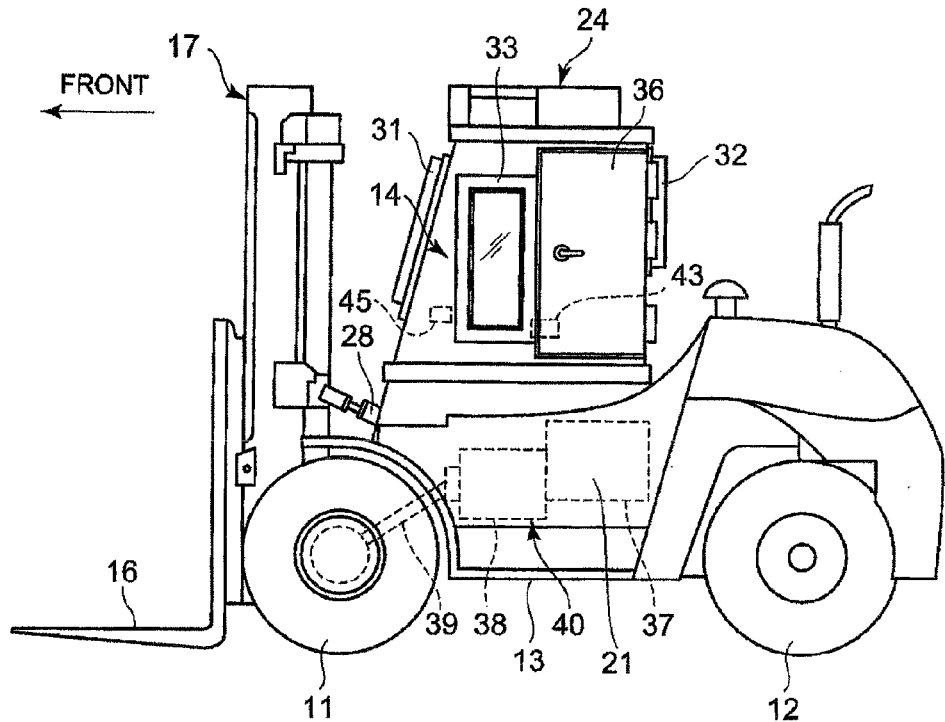
FIG. 3 is a side view of the manned vehicle for special environment use according to the present invention.

As shown in FIG. 3, the cabin 14 is attached on top of the vehicle body 13 such as to be removable, and includes a front window 31, a rear window 32, a left side window 33, and a right side window 34 (see FIG. 4) to obtain front, rear, left side, and right side fields of view, respectively, and a left side door 36 for the driver to get in and out. A door may be provided on the right side instead of the left side door 36.

As the cabin 14 is removably attached to the vehicle body 13 as described above, the cabin of a commercially available fork lift can readily be replaced with the cabin 14 described above, i.e., the fork lift can readily be altered into a manned vehicle for special environment use. Moreover, as most parts of the common fork lift other than the cabin can be used, the cost for alteration is low.

Reference numeral 37 in the drawings denotes the engine that is the power source for driving the left and right front wheels 11, 38 denotes the transmission that changes gears and transfers power from the engine 37, and 39 denotes a power transmission mechanism that transmits the power from the transmission 38 to the left and right front wheels 11. The transmission 38, power transmission mechanism 39, and left and right front wheels 11 form a vehicle moving mechanism 40. Reference numeral 43 denotes the control unit that controls various parts and engine of the vehicle, and 45 denotes electronic equipment other than the control unit.

Figure 4:
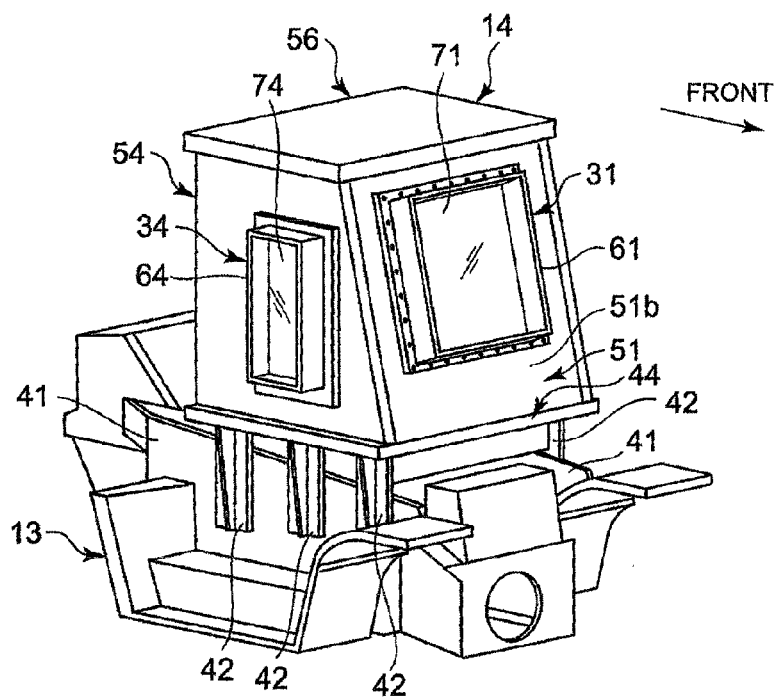
FIG. 4 is a first perspective view showing the attachment structure of a cabin according to the present invention.
Figure 5:
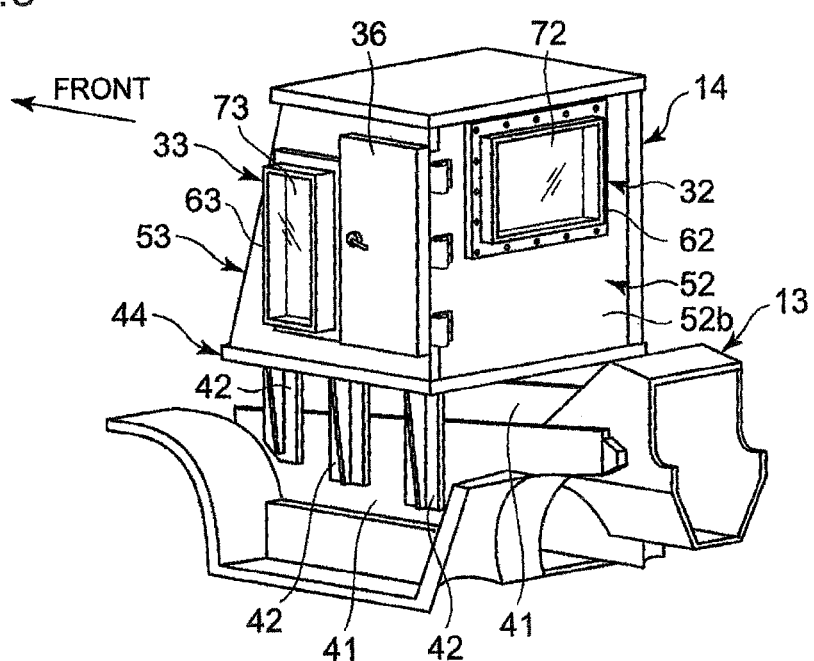
FIG. 5 is a second perspective view showing the attachment structure of the cabin according to the present invention.

As shown in FIG. 4 and FIG. 5, the vehicle body 13, as the main body of the vehicle, includes a pair of left and right vehicle body frames 41 extending in the front to back direction. A plurality each of support pillars 42 are welded to these vehicle body frames 41, these support pillars 42 supporting the cabin 14. Reference numeral 51b in the drawings denotes a front surface of a front wall 51, and 52b denotes a rear surface of a rear wall (see FIG. 7).

Figure 6A:
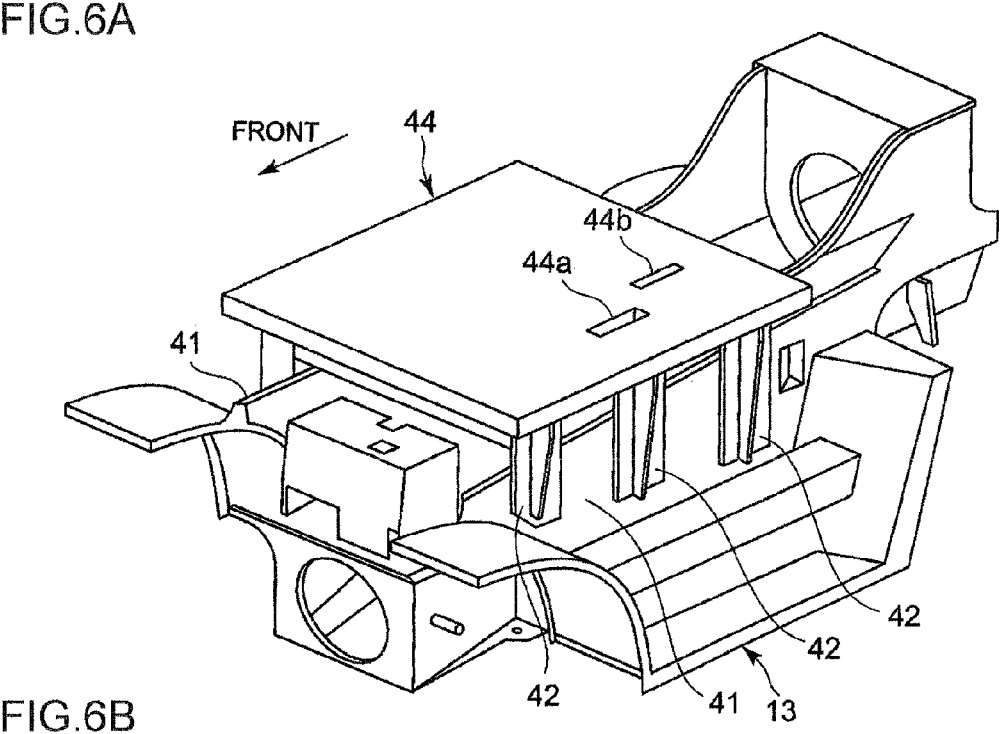
FIG. 6A is a perspective view.

FIG. 6A shows a bottom wall 44 only of the cabin 14 (see FIG. 4 and FIG. 5) that is the bottom plate at the bottom of the cabin, with the upper part of the cabin 14 removed from the illustrations of FIG. 4 and FIG. 5 for the sake of explanation of the bottom wall 44.

The bottom wall 44 has a plurality of through holes 44a and 44b for various piping, harnesses, and wire cables to pass through between inside and outside of the cabin 14.

Piping includes, for example, brake piping, and operating oil piping for hydraulic equipment. Harnesses include harnesses for electronic equipment. Wire cables include acceleration pedal cables, shift lever cables for changing gears, and operation lever cables for the forks 16 (see FIG. 1).

Figure 6B:
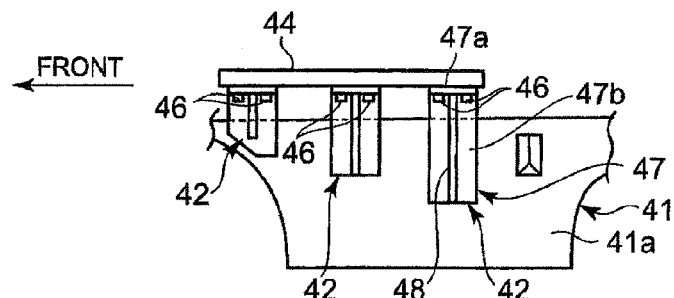
FIG. 6B is a side view.
Figure 6C:
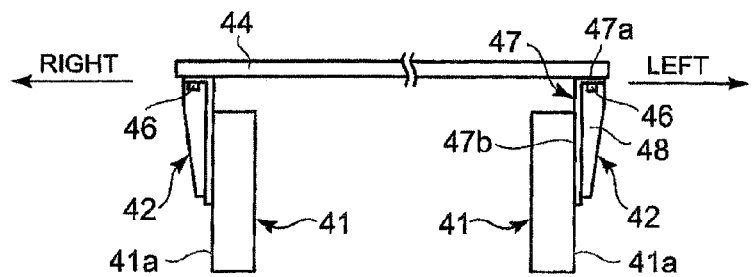
FIG. 6C is a front view, showing the attachment structure of a cabin bottom plate according to the present invention.

The bottom wall 44 is removably attached to the respective support pillars 42 each with a plurality of bolts 46 as shown in FIG. 6B and FIG. 6C.

Each support pillar 42 is made up of a main body 47 having an L-shaped cross section with an integrally formed upper wall 47a and side wall 47b, and a reinforcement 48 attached perpendicularly to both of the upper wall 47a and the side wall 47b of the main body 47 by welding.

As the side walls 47b of the respective support pillars 42 are welded to outer side faces 41a of the vehicle body frames 41, the attachment strength and support strength are high in the width direction of the support pillars 42, i.e., front to back direction of the vehicle (left-right direction in FIG. 6B) relative to the vehicle body frames 41. The support strength in the left-right direction of FIG. 6C is also high, as the reinforcements 48 of the respective support pillars 42 have their width extending in that direction. Moreover, as a plurality of support pillars 42 are attached to the vehicle body frames 41, and as these support pillars 42 support the bottom wall 44, the attachment strength and support strength of the cabin 14 are also high in the up and down direction.

As the support structure described above supports the cabin 14 three dimensionally, i.e., in three axis directions, front to back, left to right, and up and down directions of the vehicle, the cabin 14 which is a heavy object can be supported with sufficient support strength.

Figure 7:
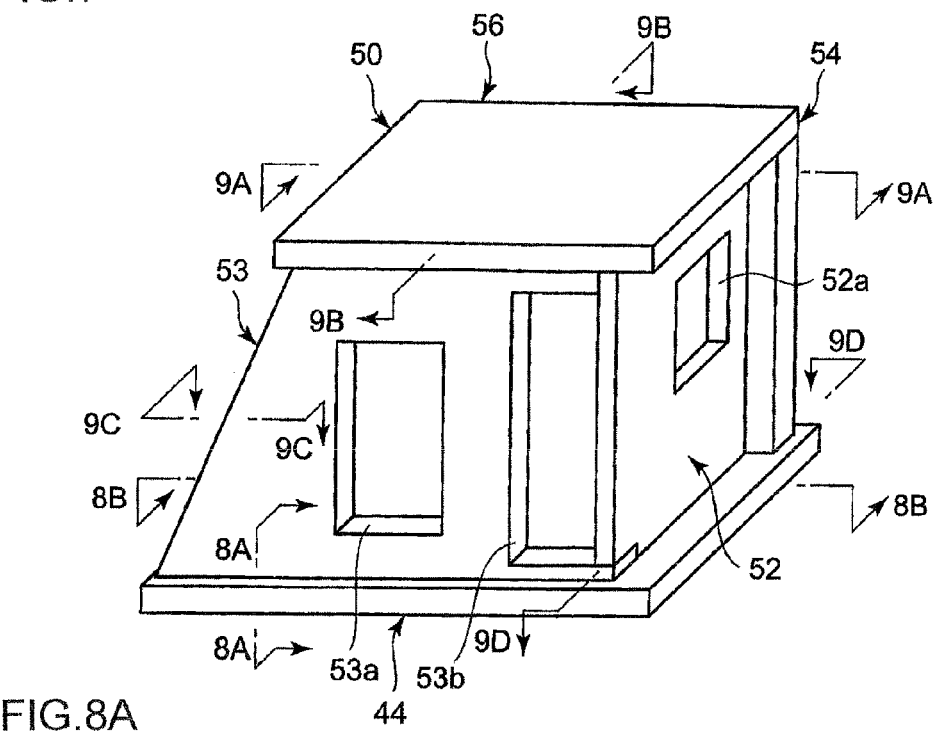
FIG. 7 is a perspective view showing a cabin body according to the present invention.

FIG. 7 shows the cabin body 50, with the front window 31, rear window 32, left side window 33, right side window 34, and left side door 36 removed from the cabin 14 shown in FIG. 4 and FIG. 5.

The cabin body 50 is made up of the bottom wall 44; a front wall 51 (see FIG. 4), a rear wall 52, a left side wall 53, and a right side wall 54 attached to the front, back, left and right of the bottom wall 44; and an upper wall 56 as the ceiling attached to the tops of these front wall 51, rear wall 52, left side wall 53, and right side wall 54.

As shown in FIG. 4, FIG. 5, and FIG. 7, the cabin 14 is a casing body with a box-like structure formed by the cabin body 50, respective windows (front window 31, rear window 32, left side window 33, and right side window 34), and the left side door 36.

In FIG. 4, the front wall 51 has an opening (not shown), with a sash 61 attached to the edges of the opening with a plurality of bolts. Lead glass 71 that is radiation shielding glass containing lead oxide is fitted in the sash 61. The sash 61 and the lead glass 71 form the front window 31.

In FIG. 5 and FIG. 7, the rear wall 52 has an opening 52a, with a sash 62 attached to the edges of the opening 52a with a plurality of bolts. Lead glass 72 is fitted in the sash 62. The sash 62 and the lead glass 72 form the rear window 32.

In FIG. 5 and FIG. 7, the left side wall 53 has openings 53a and 53b, with a sash 63 attached to the edges of the opening 53a with a plurality of bolts. The left side door 36 is hinged to open and close at one end of the rear wall 52 that forms one edge of the opening 53b. Lead glass 73 is fitted in the sash 63. The sash 63 and the lead glass 73 form the left side window 33.

In FIG. 4 and FIG. 7, the right side wall 54 has an opening (not shown), with a sash 64 attached to the edges of the opening with a plurality of bolts. Lead glass 74 is fitted in the sash 64. The sash 64 and the lead glass 74 form the right side window 34.

The bottom wall 44, front wall 51, rear wall 52, left side wall 53, right side wall 54, upper wall 56, and left side door 36 are all shield plates made of steel plate, lead plate, or a lamination of steel plate and lead plate for shielding special substances, and have a sufficient thickness to shield against the special substances.

Similarly to the lead glass 71, the lead glass 72, 73, and 74 is made of glass containing lead oxide that shields against special substances, and all the lead glass 71, 72, 73, and 74 has a sufficient thickness to shield against the special substances.

Figure 8A:
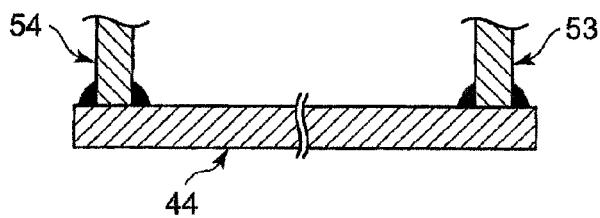
FIG. 8A is a cross-sectional view along 8A-8A of FIG. 7.
Figure 8B:
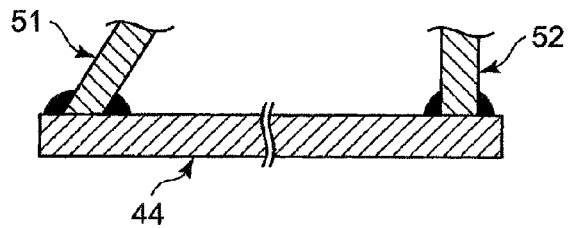
FIG. 8B is a cross-sectional view along 8B-8B of FIG. 7, showing the cabin body according to the present invention.
Figure 9A:
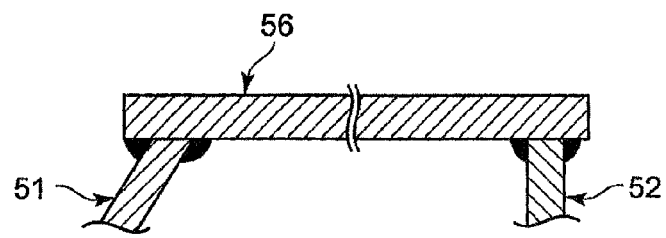
FIG. 9A is a cross-sectional view along 9A-9A of FIG. 7.
Figure 9B:
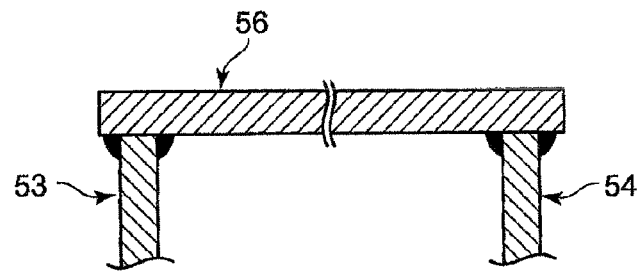
FIG. 9B is a cross-sectional view along 9B-9B of FIG. 7.
Figure 9C:
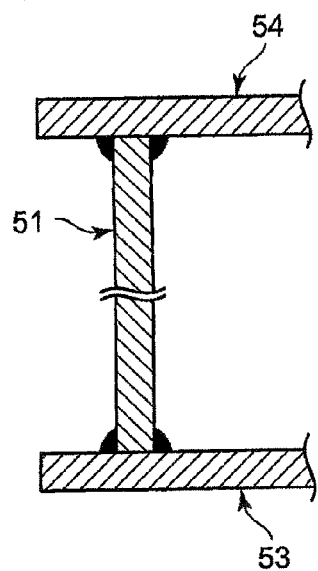
FIG. 9C is a cross-sectional view along 9C-9C of FIG. 7.
Figure 9D:
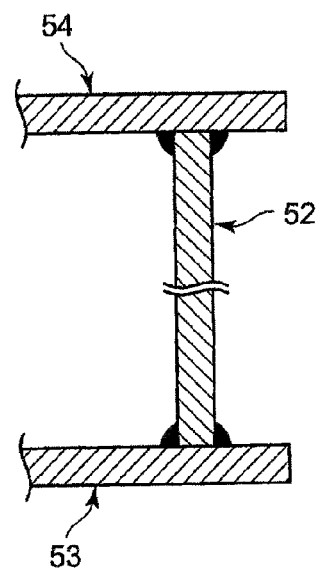
FIG. 9D is a cross-sectional view along 9D-9D of FIG. 7, showing the cabin body according to the present invention.

Fillet welding is performed so that the walls are continuous without any gap between them for joining the bottom wall 44 and the left side wall 53, the bottom wall 44 and the right side wall 54 shown in FIG. 8A; the bottom wall 44 and the front wall 51, the bottom wall 44 and the rear wall 52 shown in FIG. 8B; the upper wall 56 and the front wall 51, the upper wall 56 and the rear wall 52 shown in FIG. 9A; the upper wall 56 and the left side wall 53, the upper wall 56 and the right side wall 54 shown in FIG. 9B; the front wall 51 and the left side wall 53, the front wall 51 and the right side wall 54 shown in FIG. 9C; and the rear wall 52 and the left side wall 53, and the rear wall 52 and the right side wall 54 shown in FIG. 9D.

Figure 10:
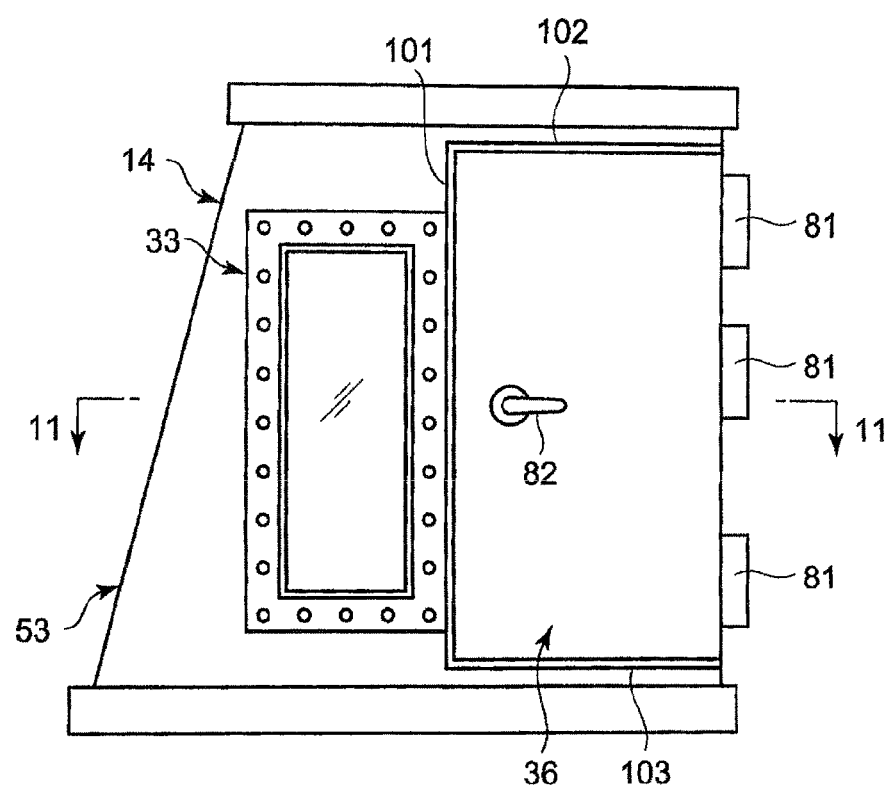
FIG. 10 is a side view of the cabin according to the present invention.

As shown in FIG. 10, in the left side wall 53 of the cabin 14 is provided the left side door 36 adjacent on the rear side of the left side window 33 for an operator who operates the operation terminal or a passenger to get in and out. The left side door 36 is attached to the rear wall 52 to be opened and closed via a plurality of hinges 81. A rotatable lever handle 82 is attached to the left side door 36 which is gripped to open and close the door. Rotating this lever handle 82 locks the left side door 36 to the left side wall 53 or releases the lock.

Figure 11:
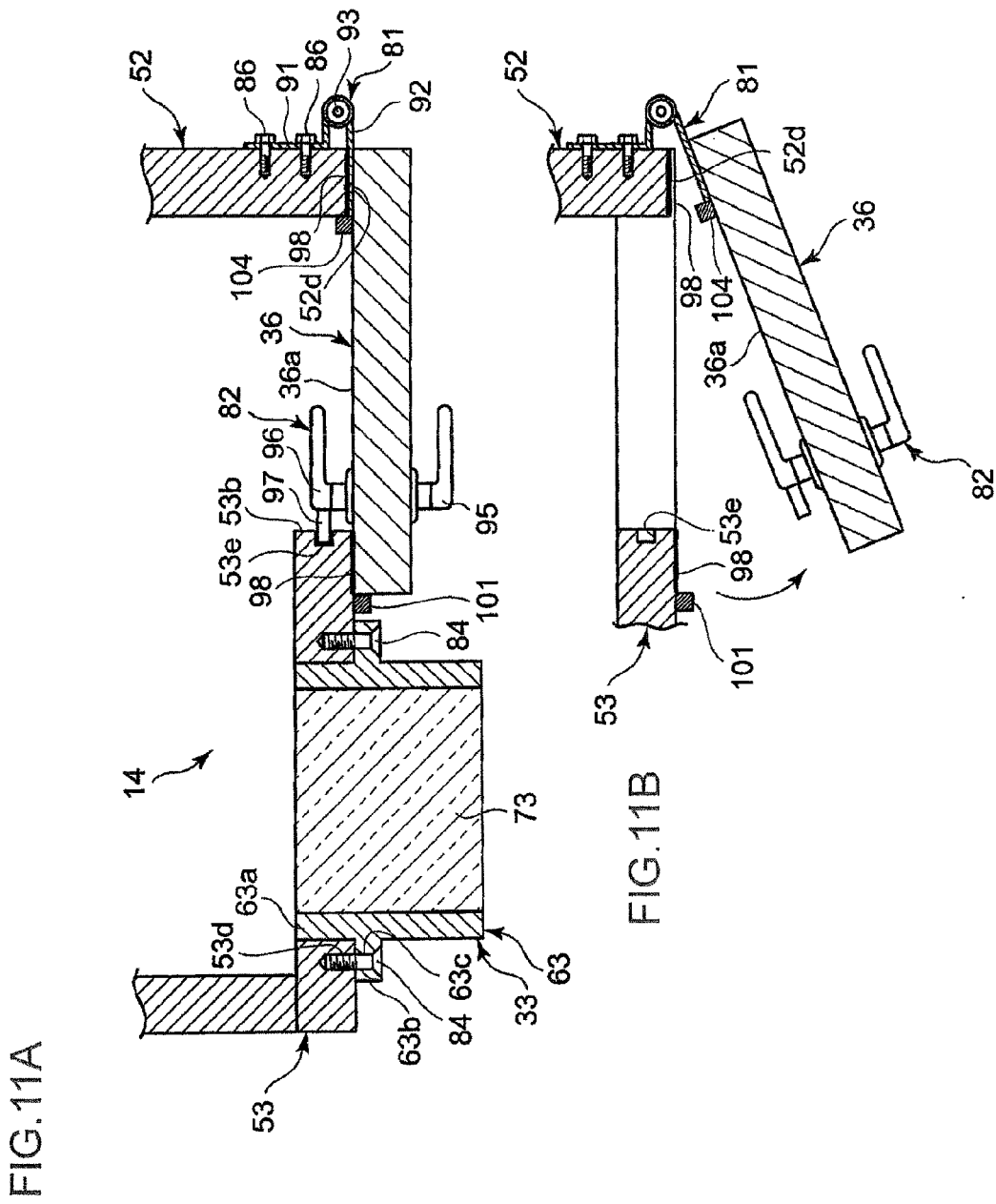
FIG. 11A is a cross-sectional view along 11-11 of FIG. 10.
FIG. 11B is a cross-sectional view with a left side door opened from the state shown in FIG. 11A, of the cabin according to the present invention.

As shown in FIG. 11A, the sash 63 of the left side window 33 consists of a rectangular frame 63a and a flange 63b integrally formed on the outer circumferential surface of the frame 63a. The lead glass 73 is tightly fitted to the inside of the frame 63a. A plurality of bolt holes 63c are formed in the flange 63b, and with bolts 84 threaded into internal threads 53d formed in the left side wall 53, the sash 63 is attached to the left side wall 53.

Each hinge 81 consists of a mount side plate 91 attached to the rear wall 52 with a plurality of bolts 86, a door side plate 92 attached to the inner face 36a of the left side door 36 by welding, and a pivot part 93 that rotatably connects these mount side plate 91 and door side plate 92.

The lever handle 82 is made up of an outer handle 95 rotatably attached to the left side door 36 and disposed on the outer side of the left side door 36, an inner handle 96 integrally coupled to this outer handle 95, rotatably attached to the left side door 36 and disposed on the inner side of the left side door 36, and a locking piece 97 attached to this inner handle 96.

A locking hole 53e is formed in the opening 53b of the left side wall 53 for the locking piece 97 of the lever handle 82 to fit in. Rotating the lever handle 82 to insert the locking piece 97 into the locking hole 53e locks the left side door 36 in a closed position.

Reference numeral 98 in the drawings denotes sheet-like sealing members that are bonded to an outer surface of the left side wall 53 and an end face 52d of the rear wall 52 around the edges of the opening 53b in the left side door 36 for providing a seal between the left side door 36 and the left side wall 53, and between the left side door 36 and the rear wall 52 when the left side door 36 is closed, to prevent ingress of special substances from outside into the cabin 14.

The sealing members 98 should preferably be made of a material having flexibility such as rubber, urethane and the like.

Reference numerals 101, 102, 103, and 104 in FIG. 10 and FIG. 11A denote long shielding blocks arranged on extension lines of possible gaps between the left side door 36 and the left side wall 53, and between the left side door 36 and the rear wall 52 when the left side door 36 is closed, for stopping progression of special substances that advance straight from outside along the extension lines of the gaps toward the gaps to prevent them from entering into the cabin 14.

FIG. 11B shows a state in which the left side door 36 is opened as indicated by the arrow, with the lever handle 82 in the state shown in FIG. 11A having been rotated to release the locking piece 97 from the locking hole 53e.

The shielding blocks 101, 102, and 103 (FIG. 10 shows 102 and 103) are attached to the left side wall 53, while the shielding block 104 is attached to the left side door 36.

By providing the shielding blocks 101, 102, 103, and 104 as described above, the gap formed between the left side door 36 and the shielding blocks 101, 102, and 103, and the gap formed between the left side wall 53 and the left side door 36 form a bent path having an L-shaped cross section (bent path for incoming radiation), so that ingress of special substances is prevented as described above. Similarly, the gap formed between the rear wall 52 and the shielding block 104, and the gap formed between the rear wall 52 and the left side door 36 or hinges 81 form a bent path having an L-shaped cross section (bent path for incoming radiation), so that ingress of special substances is prevented as described above.

Figure 12:
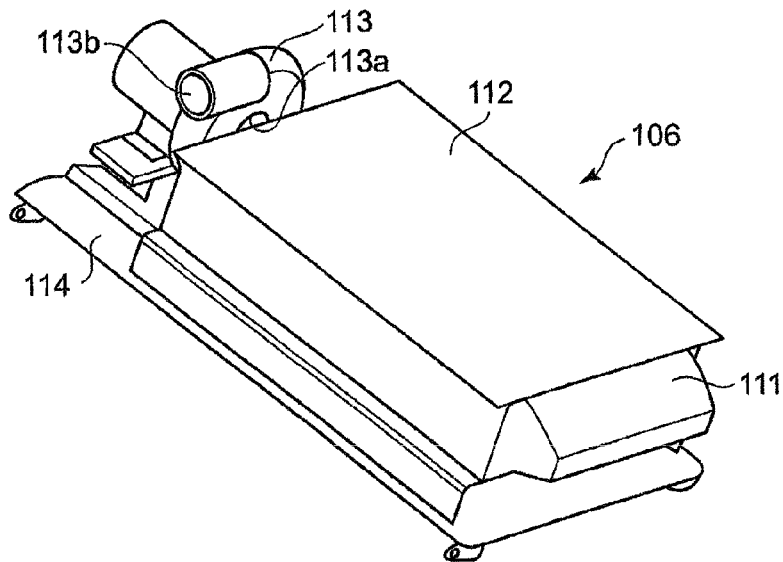
FIG. 12 is a perspective view showing a filter/suction unit of an air purifier according to the present invention.

As shown in FIG. 12, the air purifier 24 (see FIG. 1) has a filter/suction unit 106, which includes an intake port 111 that takes in outside air from below upwards, a filter 112 as a decontamination filter connected to the intake port 111 to filter the special substances in the air as the air passes through, a blower 113 having a suction port 113a connected downstream of the filter 112 to suck in air inside the filter 112, and a seat 114 that supports these filter 112 and blower 113 and attaches them to the ceiling (upper wall 56, see FIG. 1) of the cabin 14 (see FIG. 1).

As the intake port 111 takes in outside air from below upwards, special substances, dirt or dust, rainwater and the like are less likely to be sucked in.

Figure 13:
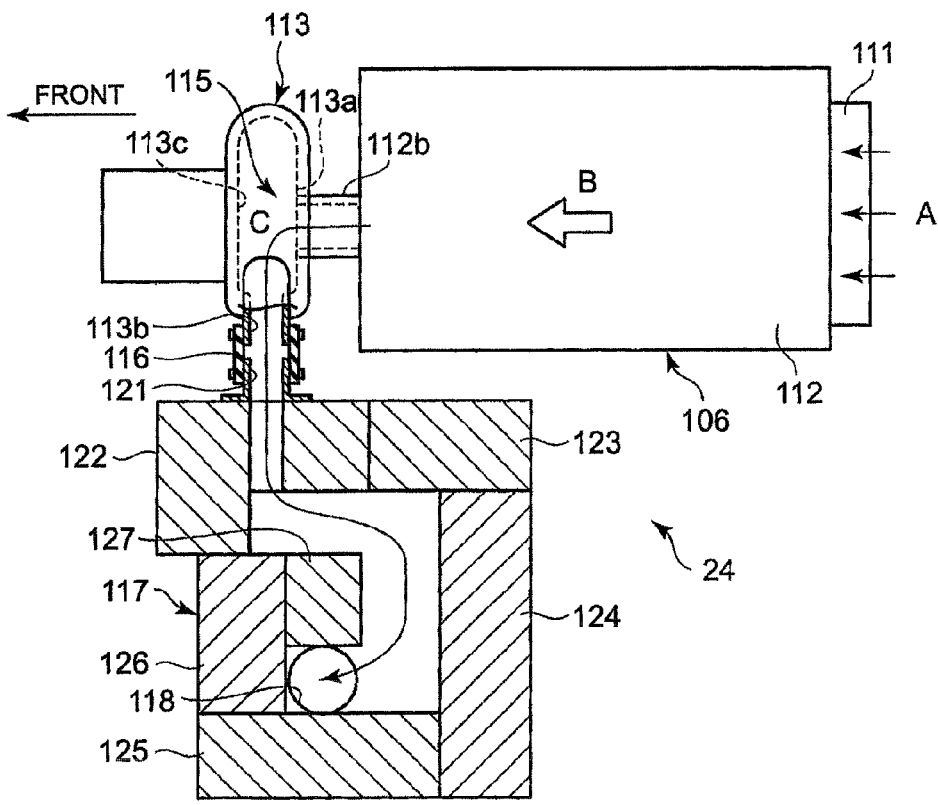
FIG. 13 is a plan view (partially cross-sectional) showing the air purifier according to the present invention.

As shown in FIG. 13, the air purifier 24 is made up of the filter/suction unit 106, a duct part 117 connected to this filter/suction unit 106, in particular to a discharge port 113b of the blower 113 forming the filter/suction unit 106 via a rubber hose 116, and a communication hole 118 opened in the upper wall 56 (see FIG. 1) of the cabin 14 to communicate the duct part 117 with the inside of the cabin 14 (see FIG. 10 and FIG. 11A). Reference numeral 112b denotes a discharge port of the filter 112, which is connected to the suction port 113a of the blower 113. Reference numeral 113c is an internal passage of the blower 113. The internal passage 113c partially forms a bent path 115 with the discharge port 112b of the filter 112.

The duct part 117 is made up of a duct entrance 121 connected to the rubber hose 116, an entrance shield plate 122 to which the duct entrance 121 is attached, five duct forming blocks 123 to 127 that form a labyrinth structure, and an upper cover 128 (not shown) that covers the entrance shield plate 122 and the duct forming blocks 123 to 127 from above. The lower face of the duct part 117 is directly welded to the upper wall 56 of the cabin 14, so that the duct part 117 and the upper wall 56 of the cabin 14 together form a sealed space as a duct.

The operation of the air purifier 24 described above will be explained next.

In FIG. 13, when the blower 113 is operated, outside air is sucked in from the intake port 111 as indicated by arrows A, and as the air passes through the filter 112 as indicated by the white arrow B, particles of special substances larger than the opening size of the filter 112 are separated from the air in the filter 112, which then flows from the filter 112 through the blower 113 via the bent path 115 into the duct part 117 as shown by arrow C.

Figure 14:
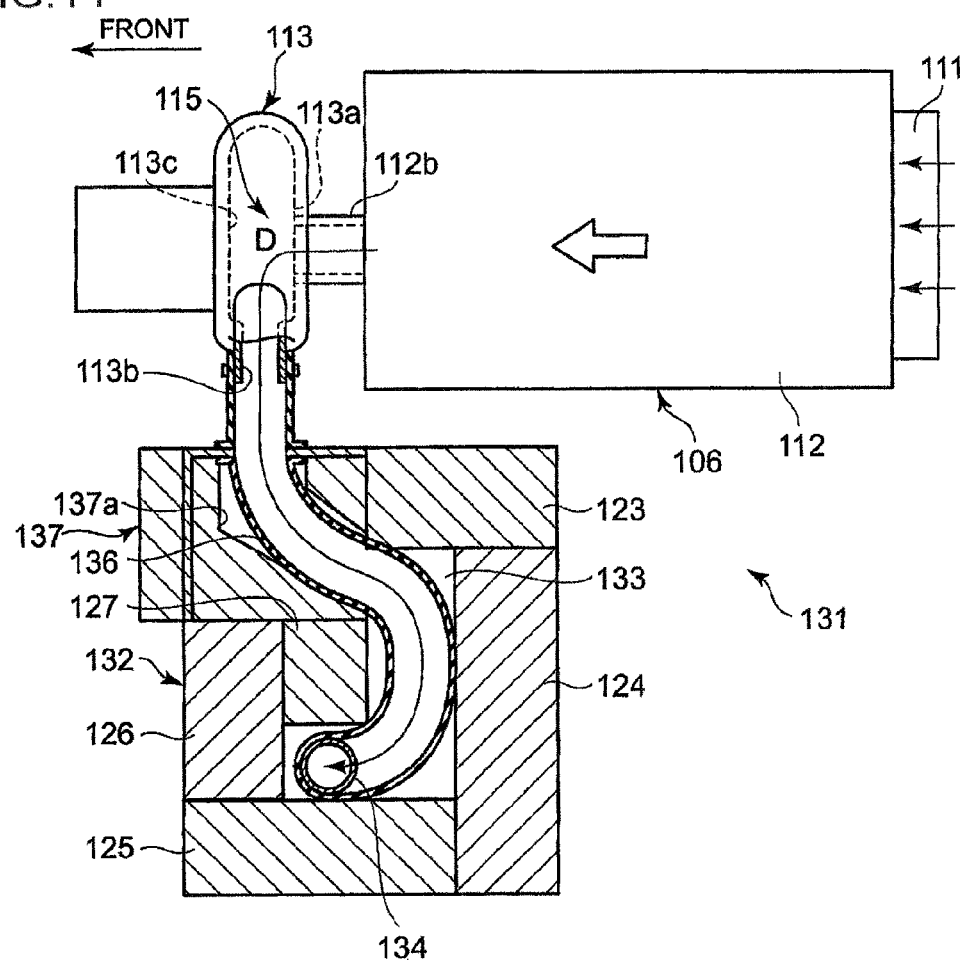
FIG. 14 is a plan view (partially cross-sectional) showing another embodiment of the air purifier according to the present invention.

A hose 136 may be provided as shown in FIG. 14. This air purifier 131 is made up of the filter/suction unit 106, a duct part 132 arranged near the discharge port 113b of the filter/suction unit 106, in particular on the left side, a communication pipe 134 attached in the upper wall 56 (see FIG. 1) to communicate a labyrinth 133 formed inside the duct part 132 with the inside of the cabin 14 (see FIG. 10 and FIG. 11A), and the hose 136 disposed along the labyrinth 133 and having one end connected to the discharge port 113b and the other end connected to the communication pipe 134.

The duct part 132 includes a conduit 137a opened inside for passing the hose 136, an entrance shield plate 137 fitted on the outer circumference of the hose 136, five duct forming blocks 123 to 127 that form a labyrinth structure, and an upper cover 128 (not shown) that covers the entrance shield plate 137 and the duct forming blocks 123 to 127 from above. The lower face of the duct part 132 is directly welded to the upper wall 56 of the cabin 14.

Figure 15:
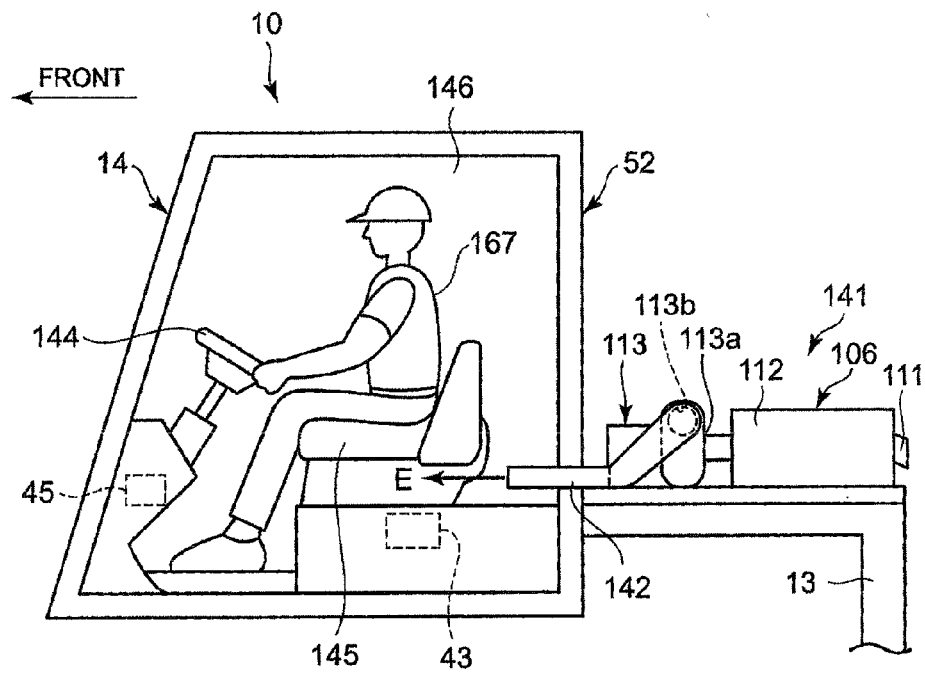
FIG. 15 is a side view (partially cross-sectional) showing yet another embodiment of the air purifier according to the present invention.

FIG. 15 shows another air purifier 141 that may be arranged behind the cabin 14 of the vehicle body 13. This air purifier is made up of the filter/suction unit 106, and an exhaust duct 142 having one end connected to the discharge port 113b of the filter/suction unit 106 and the other end extending through the rear wall 52 of the cabin 14 into the cabin 14.

The blower 113 is operated to suck in air behind the fork lift 10 and pressurize the space 146 inside the cabin 14 with the air taken in, as shown by arrow E, from which special substances have been removed.

Reference numeral 144 in the drawing denotes a handle as an operation terminal for steering the left and right rear wheels 12 (see FIG. 2), and reference numeral 145 denotes a seat for an operator who operates the operation terminal or a passenger 167 to sit on.

In the cabin 14, the control unit 43 is disposed under the seat 145, and the electronic equipment 45 is disposed inside a dash board, to avoid influence of special substances.

Figure 16:
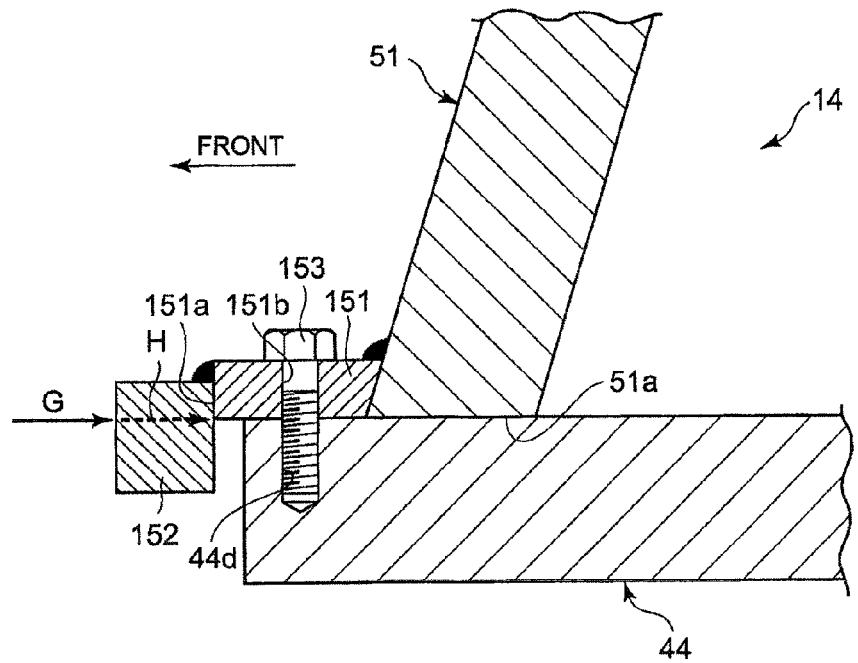
FIG. 16 is a cross-sectional view showing another embodiment of a joint between a bottom plate and a front wall and the attachment structure and effect of baffles according to the present invention.

As shown in FIG. 16, a flange 151 extending forward is welded to the front at the lower end of the front wall 51 that is part of the cabin 14, and a baffle 152 is welded to the front end face 151a of the flange 151. The flange 151 has a plurality of bolt holes 151b. A plurality of internal threads 44d are formed along the edge of the bottom wall 44. Bolts 153 are passed through the bolt holes 151b and screwed into the internal threads 44d. The front wall 51 is thus removably attached to the bottom wall 44 with the plurality of bolts 153. The rear wall 52, left side wall 53, and right side wall 54 are likewise removably attached to the bottom wall 44 with respective sets of bolts.

Therefore, as compared to the embodiment shown in FIG. 8B, the upper part of the cabin 14, when removed from the bottom wall 44, is lighter by the weight of the bottom wall 44, so that it is handled more easily.

The baffle 152 is disposed perpendicularly to an extension plane of the lower end face 51a of the front wall 51, or perpendicularly to a portion on an extension line of a gap formed between the bottom wall 44 and the front wall 51, so that special substances advancing straight from the front toward the gap between the bottom wall 44 and the front wall 51 as shown by arrow G do not progress as indicated by the dotted line arrow H, and thus ingress of special substances from the gap into the cabin 14 is prevented.

As shown in FIG. 17, if the opening 51c formed in a wall of the cabin 14, for example, the front wall 51, is closed by a shield plate 161 with a plurality of bolts 162, baffles 165 may be attached on a front face 51d of the front wall 51 such as to block the pathways along the extension line of the gap 163 formed between the front wall 51 and the shield plate 161 so that special substances will not enter into the cabin 14.

Baffles 165 should preferably be attached to the front wall 51 such as to continuously surround the shield plate 161.

Special substances advancing along the extension lines of the gap 163 toward the gap 163 as shown by arrows K are stopped by the baffles 165 and do not enter into the cabin 14 through the gap 163 and the opening 51c as indicated by broken line arrows M, so that the operator operating the operation terminal or the passenger 167 will be prevented from being exposed to the special substances.

There are gaps 168 between attachment flanges 166 that are part of the shield plate 161 and the baffles 165. However, these gaps 168 and the gap 163 together form a bent path 169 having an L-shaped cross section, so that they can effectively block the progression of special substances advancing straight from the front of the vehicle into the cabin 14.

Figure 18A:
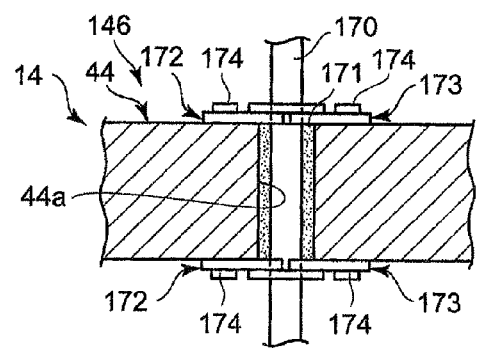
FIG. 18A is a cross-sectional view.

As shown in FIG. 18A, if a pipe 170 is passed through the through hole 44a in the bottom wall 44, the gap between the through hole 44a and the pipe 170 may be filled with lead wool 171, rubber and the like, and the gaps between the edges at both ends of the through hole 44a and the pipe 170 may be closed with respective baffles 172 and 173, so as to prevent ingress of special substances into the cabin through the gaps between the through hole 44a and the pipe 170.

Figure 18B:
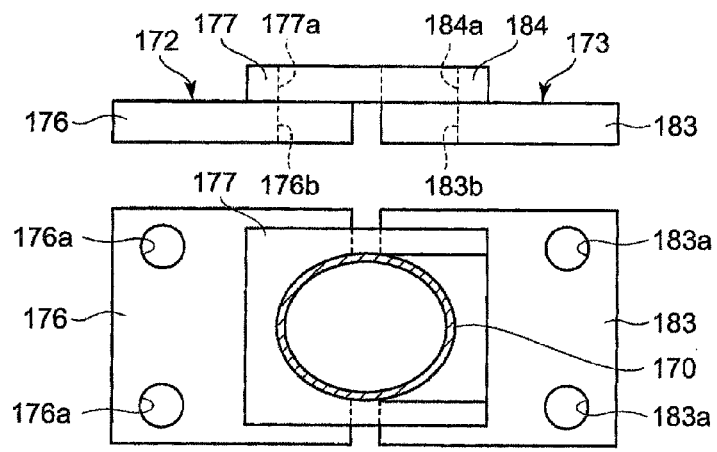
FIG. 18B is a plan view.

As shown in FIG. 18B, the baffle 172 consists of a first base plate 176 attached to the bottom wall 44 with bolts 174, and a first overlay plate 177 stacked upon and attached to the first base plate 176. The first base plate 176 has bolt holes 176a for the bolts 174 to pass through, and a cut-out 176b for passing the pipe 170. The first overlay plate 177 has a cut-out 177a for passing the pipe 170.

The baffle 173 consists of a second base plate 183 attached to the bottom wall 44 with bolts 174, and a second overlay plate 184 stacked upon and attached to the second base plate 183. The second base plate 183 has bolt holes 183a for the bolts 174 to pass through, and a cut-out 183b for passing the pipe 170. The second overlay plate 184 has a cut-out 184a for passing the pipe 170.

Figure 18C:
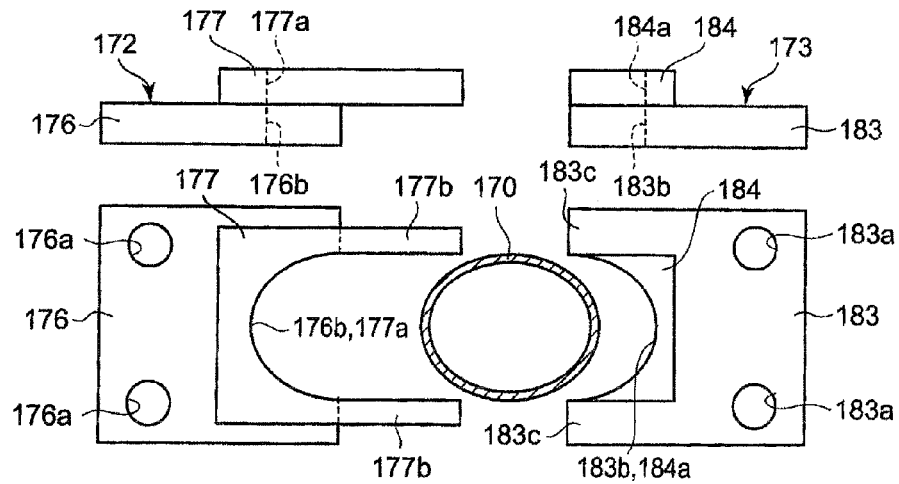
FIG. 18C is an exploded plan view, given for explanation of the attachment state of baffles according to the present invention.

As shown in FIG. 18C, the first overlay plate 177 of the baffle 172 and the second overlay plate 184 of the baffle 173 respectively have a cut-out 177a and a cut-out 184a that make tight contact with the pipe 170. The first overlay plate 177 of the baffle 172 and the second base plate 183 of the baffle 173 have overlapping portions 177b and 183c that overlap one upon another. The horizontal gap between the first base plate 176 and the second base plate 183 can therefore be closed from above and below as shown in FIG. 18A and FIG. 18B, so that special substances advancing upward from below the cabin 14 toward the cabin 14 are blocked and prevented from entering into the space 146 inside the cabin 14.

Figure 19A:
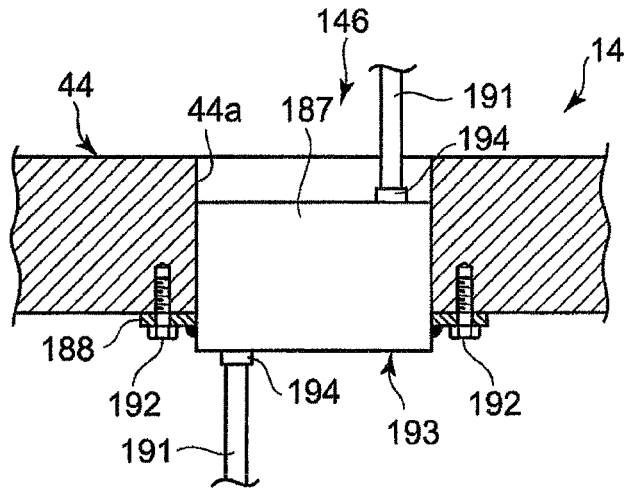
FIG. 19A and FIG. 19B are cross-sectional views showing a pipe manifold for passing hydraulic piping through the bottom plate according to the present invention, FIG. 19A showing how the pipe manifold is attached to the bottom plate, and FIG. 19B showing the pipe manifold.

As shown in FIG. 19A, if hydraulic piping 191 or air piping is passed through the opening 44a in the bottom wall 44, a pipe manifold 193 may be attached with a plurality of bolts 192 to the edges of the opening 44a of the bottom wall 44, and hydraulic piping 191 may be installed in this pipe manifold 193.

Figure 19B:
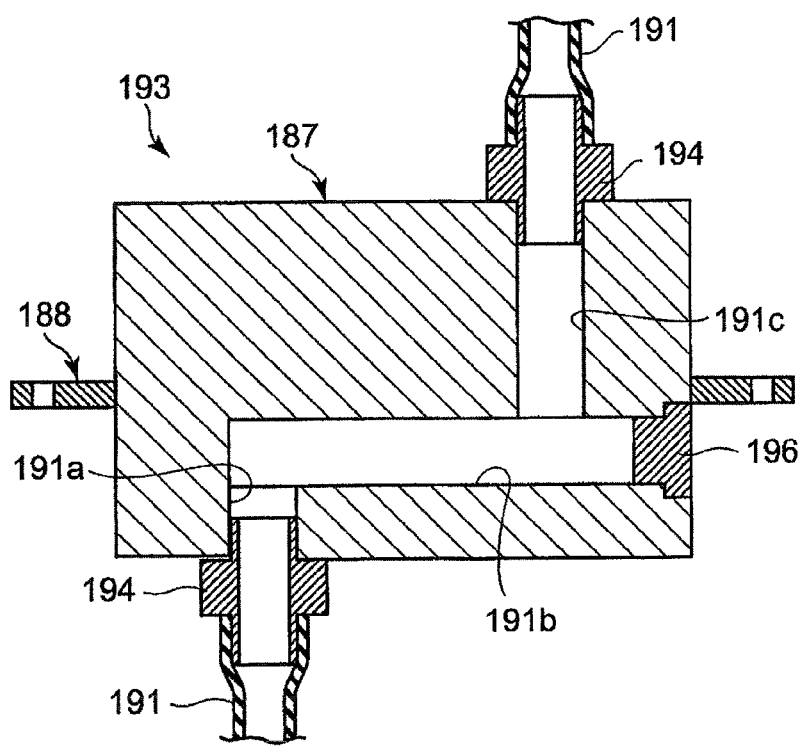

As shown in FIG. 19B, the pipe manifold 193 consists of a manifold body 187 and a flange 188 attached around the sides of the manifold body 187. The flange 188 is attached to the lower face of the bottom wall 44 with a plurality of bolts 192.

The manifold body 187 has a first passage 191a, a second passage 191b communicating with the first passage 191a, and a third passage 191c communicating with the second passage 191b. A joint connector 194 is connected to one end of the first passage 191a. One end of the second passage 191b is closed with a plug cap 196. A joint connector 194 is connected to one end of the third passage 191c.

Hydraulic piping 191 can be passed through the opening 44a in the bottom wall 44 easily by being connected to respective joint connector 194. Moreover, the gap between the opening 44a and the manifold body 187 can be closed with the flange 188.

Figure 20A:
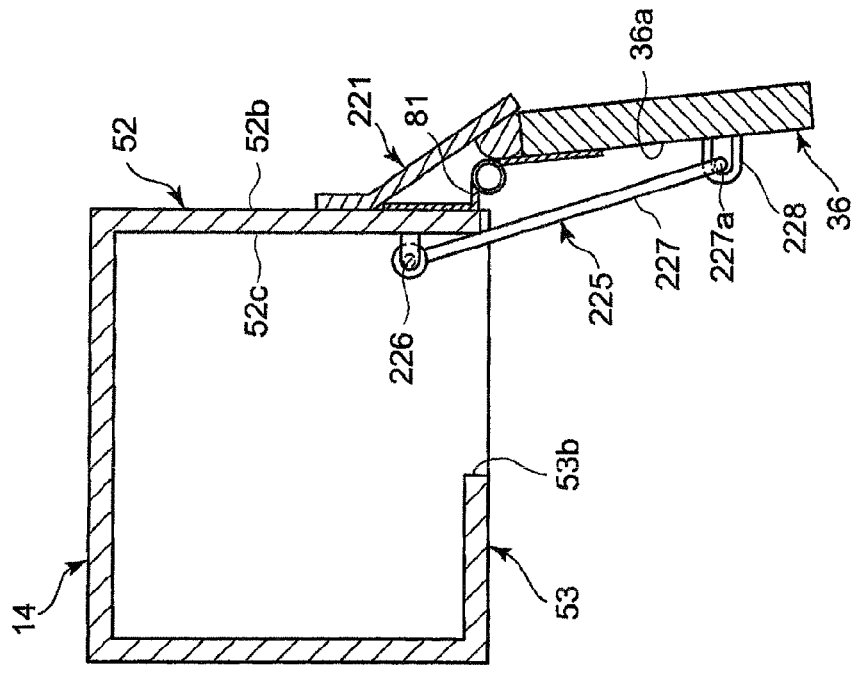
FIG. 20A is a perspective view and FIG. 20B is a cross-sectional view given for explanation of a structure for restricting the opening/closing degree of the left side door according to the present invention.

As shown in FIG. 20A, the opening angle of the left side door 36 is restricted by an opening angle restrictor 201. The opening angle restrictor 201 is made up of a wall side retainer 203 attached to the opening 53b of the left side wall 53, a door side retainer 204 attached to the inner face 36a of the left side door 36, and a chain 205 hanging between the wall side retainer 203 and the door side retainer 204.

The left side door 36 can be prevented from being completely shut, by means of a hinge 207. The hinge 207 has a fixed part 211 attached to the edge of the opening 53b of the left side wall 53, and a movable part 213 supported on the fixed part 211 such as to be pivotable up and down around a support shaft 212.

To fully close the left side door 36, the movable part 213 is turned down to retract from the open/close range of the left side door 36. To prevent the left side door from being fully closed, the movable part 213 is turned up to be located within the open/close range of the left side door 36. The left side door 36 will then abut on the movable part 213, forming a gap between the left side wall 53 and the left side door 36. There is therefore no worry that a hand or the like will get caught in the door.

Figure 20B:
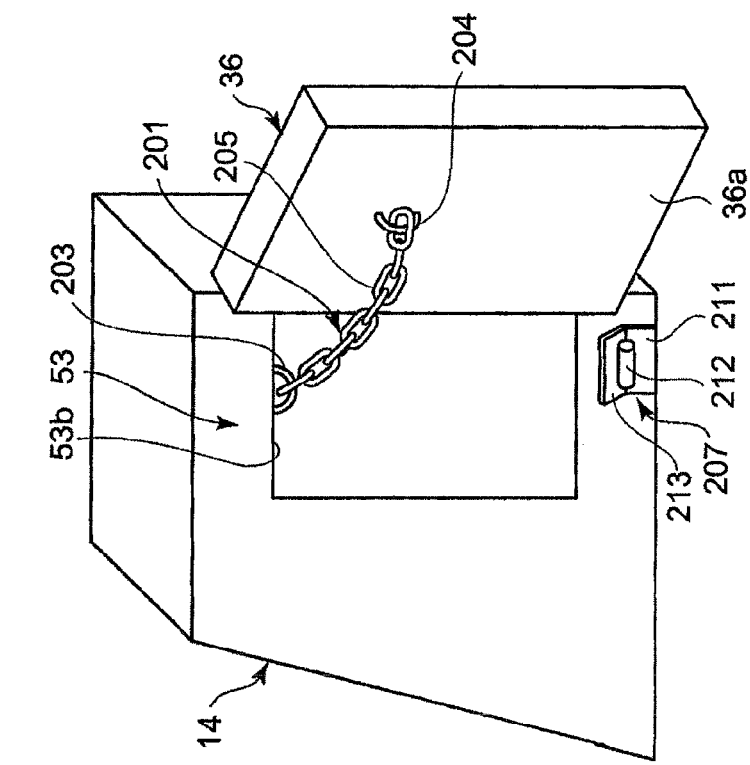

As shown in FIG. 20B, the opening angle of the left side door 36 is restricted by a stopper 221 as the opening angle restrictor. The stopper 221 is attached to the rear surface 52b of the rear wall 52. When the left side door 36 is opened widely, the tip of the stopper 221 will abut at least one of the left side door 36 and the hinges 81 so that the door does not open any further.

The left side door 36 may also be fixed in position by an open/close stopper 225.

The open/close stopper 225 is made up of a wall side fixed part 226 attached to the inner face 52c of the rear wall 52, a bar 227 pivotably coupled to the wall side fixed part 226 and having a hooked part 227a at the distal end, and a door side fixed part 228 capable of engaging with the hooked part 227a of the bar 227 and attached to the inner face 36a of the left side door 36.

As shown in FIG. 20B, with the hooked part 227a of the bar 227 engaged with the door side fixed part 228, the left side door 36 can be kept opened.

To allow the left side door 36 to open or close, the hooked part 227a of the bar 227 is released from the door side fixed part 228, and the bar 227 is pivoted around the wall side fixed part 226 to be stored inside the cabin 14.

Figure 21:
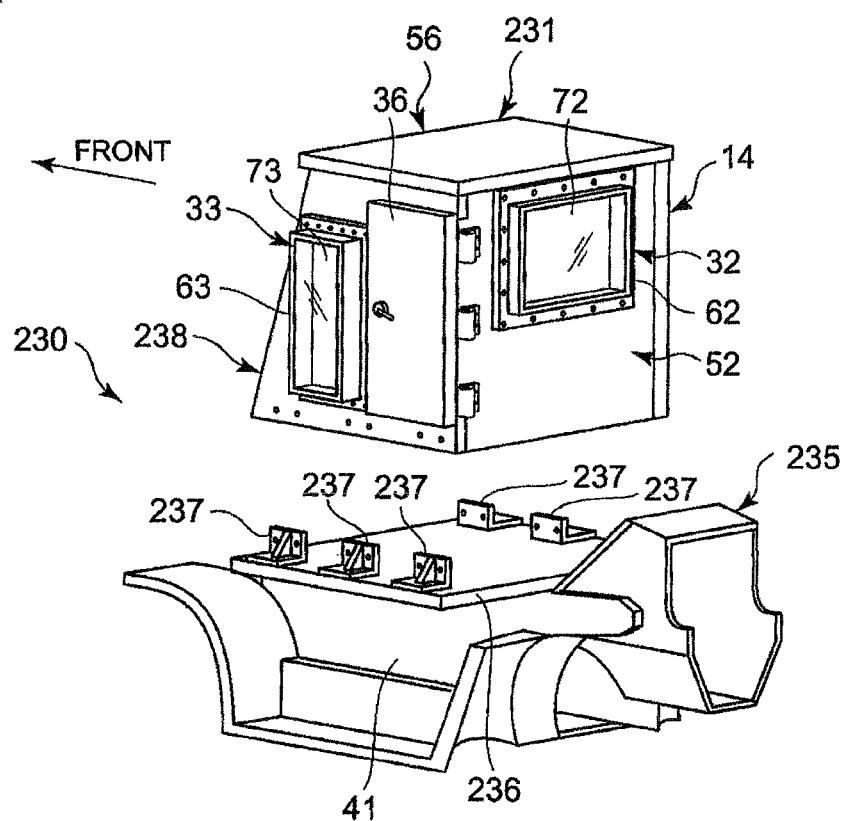
FIG. 21 is an exploded perspective view showing another embodiment of the cabin according to the present invention.

FIG. 21 shows another cabin structure. The cabin 230 that is part of the fork lift is a casing body with a box-like structure made up of a cabin upper body 231 forming the upper part, a base plate 236 attached to left and right vehicle body frames 41 that are part of the vehicle body 235 as a main body of the fork lift, a plurality of support members 237 attached on the upper surface of the base plate 236 by welding, and a plurality of bolts (not shown) for fastening the cabin upper body 231 to these support members 237.

The cabin upper body 231 is a casing body, but without the bottom wall 44 of the cabin 14 in the embodiment shown in FIG. 5, and with internal threads formed at the lower end of the left side wall 53 and the right side wall 54 (see FIG. 4). That is, the left side wall 53 formed with internal threads is the left side wall 238.

The base plate 236 is a shield plate made of steel plate, lead plate, or a lamination of steel plate and lead plate, and has a sufficient thickness to shield against the special substances.

The support member 237 consists of a plate having an L-shaped cross section, and a reinforcing plate studding between and attached to two sides of the plate. The L-shaped plate has a plurality of bolt holes for the bolts to pass through.

The support members 237 are fastened to the cabin upper body 231 by passing the bolts through the bolt holes of the support members 237 and screwing the bolt tips into the respective internal threads in the left side wall 53 and the right side wall.

As the shape of the support members 237 and the fastening structure between the support members 237 and the cabin upper body 231 are similar to the shape of the support pillars 42 and the fastening structure between the support pillars 42 and the cabin 14 shown in FIG. 6A to FIG. 6C, the support structure with the support members 237 described above supports the cabin upper body 231 three dimensionally, i.e., in three axis directions, front to back, left to right, and up and down directions of the vehicle, so that the cabin upper body 231 which is a heavy object can be supported with sufficient support strength.

The cabin upper body 231 is a casing body with a box-like structure removably attached to the vehicle body 235 with a plurality of bolts. It is configured lighter as it has no bottom wall, and with fewer number of components, so that handling such as transport or design change are easy, and the cost can be reduced, too.

While the air purifier 24, 131, or 141 in the embodiments shown in FIG. 13 to FIG. 15 is provided to the cabin 14 on its own, one alternative is, for example, to provide an air conditioner for conditioning air inside the cabin 14 that also has the pressurizing function of the air purifier.

INDUSTRIAL APPLICABILITY

The present invention is preferably applicable to manned vehicles for special environment use.

The invention claimed is:

1. A manned vehicle for special environment use, comprising:
a vehicle body having at least an engine and a vehicle moving mechanism driven by the engine; and a cabin storing an operation terminal for operating the engine and the vehicle moving mechanism and accommodating an operator who operates the operation terminal or a passenger,
wherein, the cabin is formed as a casing body partitioned and separable from the vehicle body and includes a purified air introducing unit for introducing purified air into the casing body to be configured to maintain a positive pressure level inside the cabin by the purified air introducing unit,
wherein, the casing body has at least a ceiling formed of a metal plate capable of functioning as a shielding mass,
wherein, the purified air introducing unit including a blower configured to maintain the purified pressure level inside the cabin and a decontamination filter connected to a suction port or a discharge port of the blower so as to filter special substances in air as the air passes through is installed on top of the ceiling, and
wherein the purified air introducing unit comprises:
a duct part connected to the discharge port of the blower to have a labyrinth structure; and
a communication hole opened in the upper wall of the cabin to communicate the duct part with the inside of the cabin.

2. The maimed vehicle for special environment use according to claim 1, wherein
the intake port of the purified air introducing unit for taking in the outside air is configured to take in the outside air from below upwards.

3. The maimed vehicle for special environment use according to claim 1, wherein
the casing body is covered by lead glass on a front side and a rear side in a vehicle moving direction with front and rear visibility.

4. A cabin structure of a manned vehicle for special environment use, the cabin being mounted on a vehicle body having at least an engine and a vehicle moving mechanism driven by the engine, the cabin storing an operation terminal for operating the engine and the vehicle moving mechanism and having a space for accommodating an operator who operates the operation terminal or a passenger,
wherein, the cabin is formed as a casing body partitioned and separable from the vehicle body and includes a purified air introducing unit for introducing purified air into the casing body to be configured to maintain a positive pressure level inside the cabin,
wherein, the casing body has at least a ceiling formed of a metal plate capable of functioning as a shielding mass,
wherein, the purified air introducing unit including a blower configured to maintain the purified pressure level inside the cabin and a decontamination filter connected to a suction port or a discharge port of the blower so as to filter special substances in air as the air passes through is installed on top of the ceiling, and
wherein the purified air introducing unit comprises:
a duct part connected to the discharge port of the blower to have a labyrinth structure; and
a communication hole opened in the upper wall of the cabin to communicate the duct part with the inside of the cabin.

5. The cabin structure of a manned vehicle for special environment use according to claim 4, wherein
the intake port of the purified air introducing unit for taking in the outside air is configured to take in the outside air from below upwards.

6. The cabin structure of a manned vehicle for special environment use according to claim 4, wherein
the casing body is covered by lead glass on a front side and a rear side in a vehicle moving direction with front and rear visibility.

* * * * *